3 Sheets--Sheet 1.
S. W. WARDWELL, Jr.
Sewing-Machines.
No. 148,339.    Patented March 10, 1874.
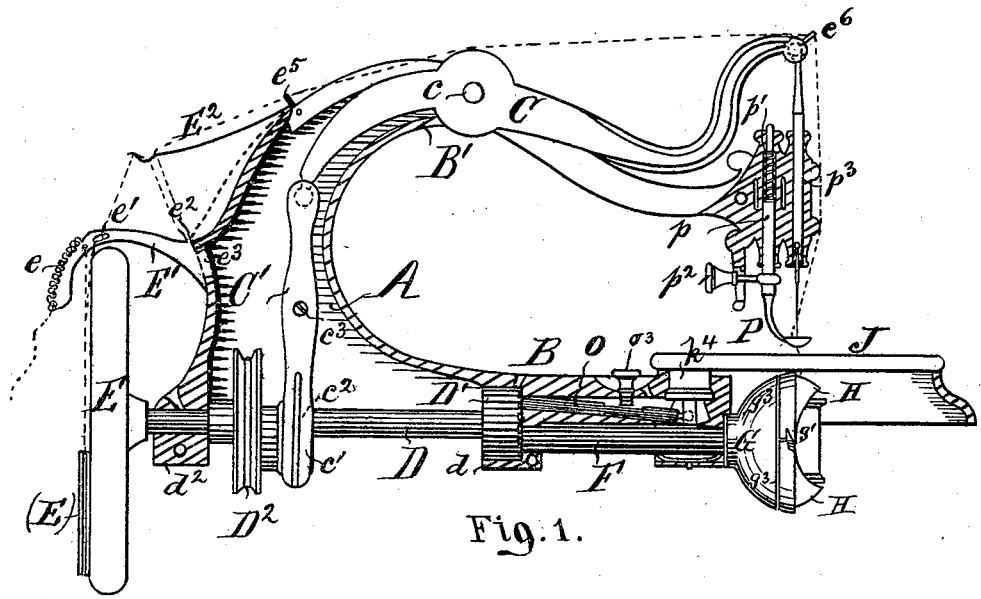
Fig. 1.
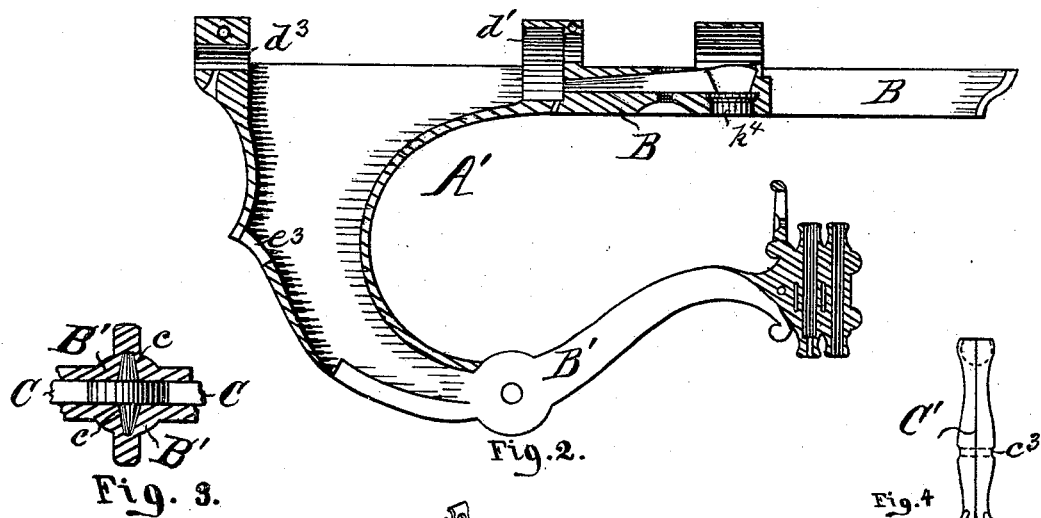
Fig. 2.
Fig. 3.
Fig. 4.
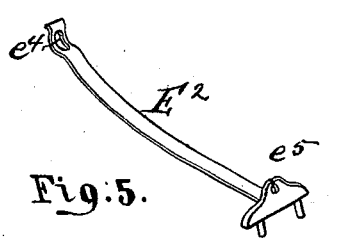
Fig. 5.
Witnesses.
Geo. W. Shaw
Chas. Meisner.
Inventor.
Simon W. Wardwell Jr.
per Herthel & Co.
Attys.

3 Sheets--Sheet 2.

S. W. WARDWELL, Jr.
Sewing-Machines.

No. 148,339.          Patented March 10, 1874.

Witnesses.
Geo W. Shaw
Chas. Meisner.

Inventor.
Simon W. Wardwell Jr.
per Herthel & Co.
Attys.

AM. PHOTO-LITHOGRAPHIC CO. N.Y. (OSBORNE'S PROCESS.)

3 Sheets--Sheet 3.

S. W. WARDWELL, Jr.
Sewing-Machines.

No. 148,339. Patented March 10, 1874.

Witnesses.
Geo W. Shaw
Chas Meisner

Inventor.
Simon W. Wardwell Jr
per Herthel & Co
Attys

UNITED STATES PATENT OFFICE.

SIMON W. WARDWELL, JR., OF ST. LOUIS, MISSOURI, ASSIGNOR TO HIMSELF AND GEORGE W. SHAW, OF SAME PLACE.

IMPROVEMENT IN SEWING-MACHINES.

Specification forming part of Letters Patent No. 148,339, dated March 10, 1874; application filed December 16, 1873.

*To all whom it may concern:*

Be it known that I, SIMON W. WARDWELL, Jr., of St. Louis, Missouri, have invented an Improved Sewing-Machine, of which the following is a specification:

This invention belongs to sewing-machines of that class designed to form the "lock-stitch" from two ordinary spools.

The invention here presented is an improvement in the following important features: First, the bed-plate and arm or body of the machine is cast or formed in two parts or halves, being counterparts to each other, so that each part composing the machine, whether movable or stationary, finds half its bearings in the one half-counterpart, the other half of said part finding its bearings in the other half-counterpart. Secondly, forming the driving-shaft with its spur-gear, eccentric, and belt-wheel of one solid piece, and the pitman in sectional halves, in combination with vibrating arm and sectional frame of the machine; also, in combination with driving-shaft, forming the arbor, its pinion, and spool-case holder of one piece. Thirdly, to the improved construction of parts forming and composing the "take-up." Fourthly, to the improved construction of spool-case holder and spool-case proper, and the manner of passing the upper thread between said parts, so that no strain upon the thread results in its passing over spool-case. Fifthly, to the improved construction of parts and their arrangement to operate within the cloth-plate and bottom plate, to produce the required feed for cloth. Sixthly, to the manner of setting and securing needle proper in jaws of needle-bar. Lastly, to certain detail construction of parts, all of which will now more fully appear.

Figure 6:
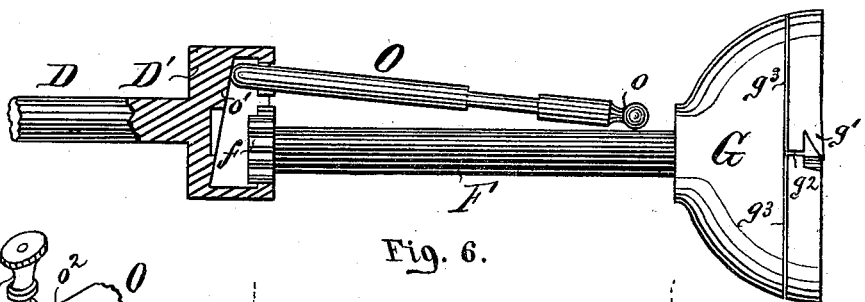
Figure 11:
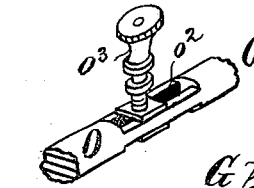
Figure 7:
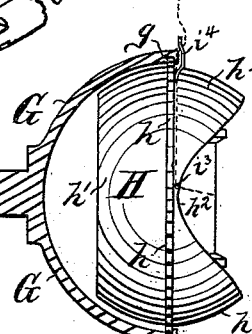
Figures 8, 12:
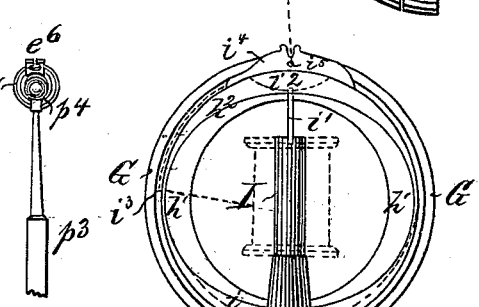
Figure 9:
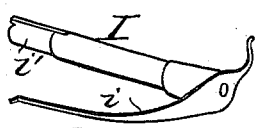
Figure 10:
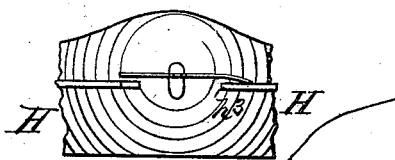
Figure 14:
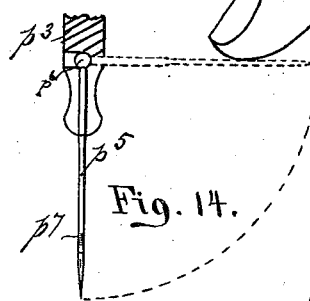
Figure 13:
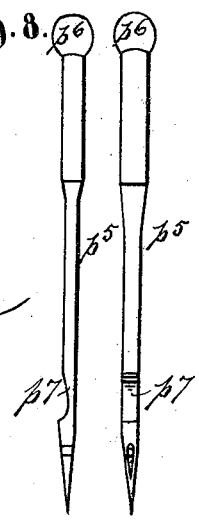
Figures 15, 16:
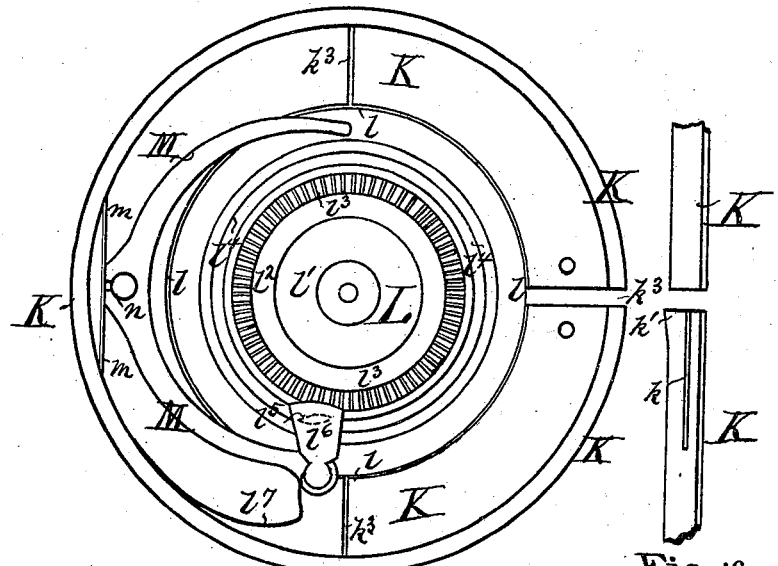
Figure 17:
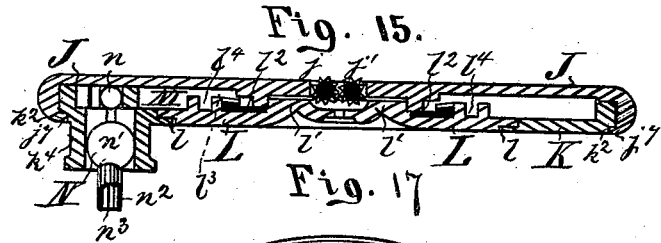
Figure 18:
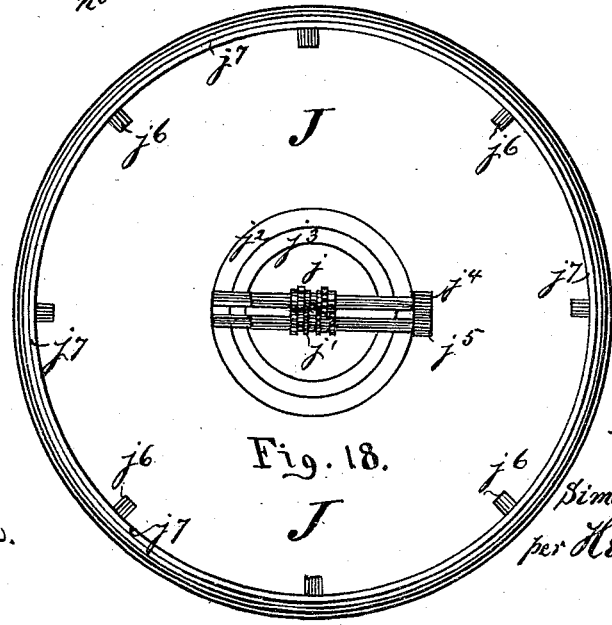

Of the drawings, Sheet 1, Figure 1 is a longitudinal sectional elevation, showing one counterpart of the machine with its interior operating parts, Fig. 2 being the other counterpart, and shown as if taken off from part shown in Fig. 1; Fig. 3 being a detail sectional view, showing projecting side pivots of vibrating arm engaging the bearings in the stationary arm, Fig. 4 being a detail view of pitman, showing its sectional feature chiefly. Fig. 5 is a perspective of slack-spring. Of Sheet 2, Fig. 6 is a side elevation of spool-case holder, its arbor, and connection to spur-gear of driving-shaft, and it also shows the feed-bar of the feed devices. Fig. 7 is a section of spool-case holder and side elevation of spool-case proper containing spool. Fig. 8 is a front elevation of spool-case holder and spool-case, within which is the spool-shaft. Fig. 9 is a perspective of spool-shaft and spring attachment. Fig. 10 is a detail top view of spool-case, showing abrupt termination of its annular rim. Fig. 11 is a detail perspective of part of feed-bar, showing set-screw connection. Fig. 12 is a detail view, showing connection of needle-shaft to end of vibrating arm; Fig. 13, views showing improved needle. Fig. 14 is a detail view, showing needle-connection to jaws of needle-shaft. Of Sheet 3, Fig. 15 is a top plan of bottom plate, consisting of revolving feed-plate, outer ring-plate, and feed-operating parts. Fig. 16 is a detail side view of rim of ring-plate, showing its projection to stop reverse operation of feed devices. Fig. 17 is a sectional elevation through cloth and bottom plates, and their interior contained feed-operating devices. Fig. 18 is a bottom plan of cloth-plate.

As stated in the nature of my invention, I divide the machine sectionally. This enables me to cast or form the hollow body, consisting of bed-plate and arm, in sections A A'. The sections A A', (see Figs. 1 and 2,) are perfect counterparts to each other, so that when fitted together and united they are the same, and form one complete whole. Thus sectionally forming the body of the machine enables me to place the parts composing same (whether movable or stationary) so that each of said parts has half its bearings in each of the sections A A'. B is the bed-plate, forming part of which is the arm B'. (See Figs. 1, 2.) Within the arm B' is provided the vibrating arm C. The arm C consists of a single piece, having the pivots c, which project from both sides. (See Fig. 3.) Otherwise said arm is formed to fit between each half of the stationary arm $b'$, and oscillate upon its pivots $c$, which find their bearings in the respective halves of the arm $B'$, when the same, or its sections $A A'$, are united. On the inner end of the vibrating arm $C$ is a pitman, $C'$. (See Fig. 1.) The pitman $C$ terminates with a circular yoke, $c^1$, at its lower end, and at its upper end is made hollow. The improved feature, specially, in pitman consists in forming the same of two vertical halves, counterparts to each other. (See Fig. 4.) To connect pitman to vibrating arm $C$, the inner end thereof terminates with a ball, Fig. 1, which fits within the corresponding hollow aforesaid at upper end of pitman $C'$, thus forming a ball-joint, as shown in Figs. 1 and 4. At its lower end the pitman $C'$, by its yoke $c^1$, Figs. 1 and 4, engages an eccentric, $c^2$, on the shaft $D$. The pitman $C'$ thus connected, its two counterparts are united by a screw, $c^3$, Figs. 1 and 4. The screw $c^3$ further serves to obviate any play at bearing-connections of said pitman. The eccentric $c^2$, when its shaft $D$ is operated by means of the pitman $C'$, imparts to vibrating arm $C$ the required oscillating motion. The shaft $D$, spur-gear $D^1$, eccentric $c^2$, and belt-wheel $D^2$, in proper relation and operative position, are all formed or cast of one piece. Hence, when placed in sections $A A'$, all said parts are free to operate within the hollow of the bed-plate $B$. The shaft $D$, at its inner end, finds its bearing by means of its spur-gear $D^1$, turning in brackets $d$ $d^1$ of each section $A$ $A'$, the outer end of said shaft freely turning in the bearings $d^2$ $d^3$ of said sections $A A'$, as shown in Figs. 1 and 2.

Take-up: $E$ is the fly-wheel. This has a disk-wheel, $E$, Fig. 1. $E^1$ is the tension-arm. This I form, at its outer end, to have thread-openings, communicating with a series of holes, $e$. (See Fig. 1.) $e^1$ is an enlarged opening in tension-arm for passage of the thread. At its inner end, the tension-arm $E^1$ has an eyelet, $e^2$, and flattened bearings $e^3$, which fit in corresponding bearings in the arm $B'$. (See Figs. 1 and 2.) Therefore, when the arm $B'$ or its sections $A A'$ are united, they, at same time, secure the tension-arm $E^1$ in operative position, as shown in Fig. 1. Although held as described, the tension-arm $E^1$ can also be sectionally divided, or cast in sections, so that each part thereof forms part of the sections $A$ $A'$; the object of the series of thread-openings $e$ in tension-arm $E^1$ being to permit the thread to be placed in a greater or less number of the openings $e$, in order to increase or diminish the tension, and thus avoiding the necessity of breaking the thread, which would occur were said openings not as shown, after the needle is threaded. To the arm $B'$, at top, a slack-spring, $E^2$, is properly secured. Said spring $E^2$, at its outer end, is curved, and has a slot, $e^4$, while, at its bearing end, is an eyelet, $e^5$, (shown in Fig. 5,) the purpose of the spring $E^2$ being to take up all slack as the needle comes down, thus preventing the thread from accumulating round the needle. The passage of the upper thread is from the spool through the tension-arm $E^1$—that is, in and out of its thread-openings $e$—down and round the disk-wheel $E$, up through the opening $e^1$ in tension-arm, through the slot $e^4$ of the spring, through eye $e^2$, back again through slot $e^4$ of spring, and through its eyelet $e^5$ over top of the arm $C$; thence through its eyelet at $e^6$, and, finally, passes to the needle, as seen in Fig. 1. Thus, each time the needle rises, the action of the fly-wheel will be to act as take-up, the combined operation of such parts being such as to take up only that length of thread just sufficient to complete the stitch.

Spool-case holder and case: The spur-gear $D^1$ on the end of the shaft $D$ gears with pinion $f$, Fig. 6, which is on the end of arbor $F$, carrying at its other end the spool-case holder $G$. (See Figs. 1 and 6.) The arbor $F$, its pinion $f$, and spool-case holder $G$ are formed of one piece. The spool-case holder $G$ and its connections are such as to perform two revolutions to each revolution of the driving-shaft. The spool-case holder $G$, at its circumferential edge, has an annular groove, $g$, fitted to receive the annular projection of the spool-case $H$. (See Fig. 7.) Also, the holder $G$ is formed to have a hook, $g^1$, which catches the upper thread, the opening to said hook being slightly beveled for the more ready passage of the thread into hook engagement. (See Fig. 6.) The improved chief features of the spool-case holder and spool-case proper are, however, as follows: I construct the holder $G$ to be hemispherical in shape. (See Figs. 1, 6, 7, 8.) From its opening at the hook, I provide the holder $G$ with a slight slit, $g^2$, communicating with a running slot, $g^3$, near the outer periphery of said holder, Figs. 1, 6. The slit $g^2$ and running slot $g^3$ allow the circumference of the spool-case holder to have a slight spring action, which permits the spool-case proper to be sprung into said holder. The spool-case $H$ is of the shape shown in Figs. 7, 8—that is, both sides of its annular rim $h$ are formed partly spherical, as at $h^1$ $h^2$, and so that the part $h^1$ operates within the holder $G$, with sufficient space between for the passage of the thread. The part $h^2$ of spool-case is beveled to its outer edge, and this, further, is made to recede in curved form to a point contiguous to the annular rim $h$, forming an oval-shaped outline, as indicated at $h^2$ in Figs. 7 and 8, the design of thus forming the part $h^2$ being to cast off the thread over said part, or over the outer part of spool-case. As the hook $g^1$ throws the needle-thread (or outward thread) inside of the spool-case holder and spool-case, said needle-thread is carried over the inner spherical side $h^1$ of the spool-case, and consequently said side $h^1$ need not be cast or formed similar to the outer side $h^2$. In regard to the outer side $h^2$ of spool-case the design of its shape is, however, such that the thread which was inside and becomes the outside by the action of the hook aforesaid (being outside of the annular rim $h$) simply lies on said outer side of spool-case, and, having no action by its own accord, is permitted gradually to fall off the spool-case. To effect the passage of the thread between the bearings of spool-case and spool-case holder, the annular rim $h$ of spool-case is partially cut away at top, (see Fig. 10,) so that its end or abrupt termination $h^3$ receives the loop from the hook. To insert the spool-case H, place same so that its projecting rim $h$ comes in line with the groove $g$ of holder, and, by pressure, cause said holder to distend outwardly, which action, taking place readily, enables and allows the spool-case to be "sprung" into said holder.

Spool-shaft: Within the spool-case H is provided the spool-shaft I, upon which the lower spool is placed. (See Figs. 1, 7, 8, 9.) Forming part of the spool-shaft I is a curved spring, $i$, fitted by its hook ends (see Figs. 8, 9) to engage proper holes formed in spool-case. Thus arranged, the spool-shaft I (or spool) can readily turn upon the bearings of the spring $i$ in direction in and out of the spool-case, which movement facilitates the ready withdrawal or placing on of the spool-thread, without the necessity of removing the spool-shaft. At its upper extremity the spool-shaft I has an upright clasp, $i^1$, the edge of which is curved, terminating in a stop. (See Figs. 8, 9.) The clasp $i^1$ engages an upper bearing, $i^2$, Fig. 8, which forms part of the spool-case. Thus the spool-shaft I is rendered self-fastening, and can be readily clasped or disclasped.

The under thread from spool simply passes through an eyelet at $i^3$, up along and contiguous to the outside of the annular rim $h$, between the top bearing $i^4$ of spool-case H, and out through its eyelet $i^5$, as indicated in Figs. 7 and 8.

Feeding devices: J is the cloth-plate. The bottom plate consists of the outer ring-plate K and the inner feed-plate L. (See Fig. 15.) The bottom-plate parts K L, as well as cloth-plate J, are formed with relation to each other so as to form a casing to contain the feed devices, as indicated in Fig. 17. Hence I form the cloth-plate J, ring-plate K, and feed-plate L, as follows: In cloth-plate J, $j j^1$ are the feed-wheels. The respective arbors of feed-wheels $j j^1$ turn in bearings properly made in the raised centers $j^2 j^3$, provided in the cloth-plate. (See Fig. 18.) The arrangement of the feed-wheels is further such as to partly protrude, as usual, through the opening in the face of the cloth-plate, and by their roughened edges engage the cloth. Each of the arbors of feed-wheels, at one end, has pinions $j^4 j^5$, Fig. 18, to engage gear on the feed-plate L. $j^6$, Fig. 18, are notches relatively positioned in cloth-plate J, the object thereof being to prevent the reverse movement of the cloth-plate. Further, I form the cloth-plate J so that its outer circumference terminates with a bottom projecting rim, $j^7$. (See Figs. 17, 18.) This holds and seats the bottom ring-plate K in engagement.

Ring-plate: The ring-plate K has its circular rim near the top edge slotted, as at $k$, and provided with a projection or stud, $k^1$. (See Fig. 16.) The slit $k$ imparts to its stud $k^1$ a spring action, so that the same engages a notch, $j^6$, of cloth-plate, when same is revolved in reverse direction. Said stud is released when the change of cloth-plate is directed in the right direction, and the proper revolution of the cloth-plate can take place at the will of the operator. At bottom the rim of ring-plate K has a groove, $k^2$, so as to form with the projecting rim $j^7$ of cloth-plate a rabbet-joint. (See Fig. 17.) In order to spring into cloth-plate J the ring-plate K, I provide the same with diametrical slots, as at $k^3$. (See Fig. 15.) The slots $k^3$ allow the ring-plate to contract and expand. By, therefore, contracting said ring-plate and placing its grooved edge $k^2$ to fit in the projecting rim $j^7$ of cloth-plate, said ring-plate can readily be sprung and by expansion fastened in said cloth-plate, or taken out. Forming part of the ring-plate K is a cylindrical shaft, $k^4$, Figs. 1 and 17, by means whereof the cloth-plate and contained feed devices can be turned or removed either right or left from over the spool-case. Hence the shaft $k^4$ of ring-plate is seated to revolve in corresponding bearings formed in the bed-plate B or its sections A A', as indicated in Figs. 1, 2. Further, the inner circular edge of ring-plate K is grooved to receive the correspondingly-shaped edge at the outer circumference of feed-plate L, as shown at $l$, Figs. 15 and 17.

Feed-plate: The feed-plate L thus seated can freely revolve when acted upon; also, it forms, by fitting flush with ring-plate K, the complete bottom plate aforesaid. The center $l^1$, Fig. 15, of feed-plate L is raised so as to form a closing bearing to retain the feed-wheels in their bearings. Around the center $l^1$ a groove, $l^2$, Fig. 15, is left by way of allowance, and in which the raised center $j^3$ of the cloth-plate is fitted. Surrounding the groove $l^2$ the face of feed-plate L is toothed or has a gear, $l^3$, Fig. 15, which meshes with and operates the feed-wheels in the cloth-plate.

The operation of the feed-wheels, by the revolution of the feed-plate L, is effected as follows: I further form the feed-plate L so as to have annular raised rings and form the annular chamber $l^4$. (See Fig. 15.) In the chamber $l^4$ the tooth $l^5$ of a dog, $l^6$, bites, said dog being connected to one end of a curved arm, M. (See Fig. 15.) A spring, $l^7$, engages at one end the rim of the ring-plate K, and the other end of the spring bears against the dog and retains it in proper operative position.

The curved arm M is of the construction as shown in Fig. 15, both its ends being made to engage the outer raised ring that forms the annular groove $l^4$ of feed-plate. A spring, $m$, Fig. 15, engaging the rim of ring-plate K, acts upon the back of curved arm M to return the same to its original operative position. Further, I connect the curved arm M, so as to have a universal joint, with a sleeve-coupling, N. The sleeve-coupling N, Fig. 17, I form to have a neck and ball-head, $n$, fitted to engage the corresponding head and neck openings left in the curved arm M. (See Figs. 15 and 17.) The body of the sleeve-coupling N I form spherical, as at $n^1$, Fig. 17, which operates in the cylindrical shaft $k^4$ of ring-plate K. The connection of the coupling N with the shaft $k^4$ of ring-plate is, therefore, such as not to interfere with the proper revolution of said shaft, and consequent operation of cloth-plate, as well as to permit a free and ready operation in all directions so far as it regards the proper movements said coupling has to make, or to impart to the feed devices that operate the feed-plate. Thus connected to arm M, and operating in the shaft of ring-plate, the sleeve $n^2$, Fig. 17, of sleeve-coupling projects sufficiently to make connection with the feed-bar. The bottom plate, consisting of ring-plate K, feed-plate L, with the feed devices arranged as thus far described, together with cloth-plate J and its feed parts, when placed in connection, (or said bottom plate sprung into said cloth-plate,) so incase the feed devices in one connected whole as readily to be placed in or out of operative position in the bed-plate. When, therefore, to be placed in said bed-plate, the connection of the feed-bar with the sleeve-coupling is made, as well as the connection of feed-bar to driving-shaft.

O is the feed-bar. The outer end of feed-bar O has a flattened neck, terminating in the ball-head $o$. (See Fig. 6.) The neck is passed in the open slit $n^3$, Fig. 17, of the sleeve $n^2$, in order to insert also into the same the head $o$. Thus connected, the operation of feed-bar O is imparted to sleeve-coupling N. The inner end of feed-bar O engages the spur-gear D of driving-shaft. (See Figs. 1 and 6.) The bearing of the feed-bar O being in the bed-plate B, the latter, or its sections A A', is hollowed the length of the feed, and sufficient play is allowed for said feed-bar to freely perform its movements.

The rotary motion of the driving-shaft I convert to a reciprocating motion to operate the feed-bar O. Therefore, the spur-gear $D^1$ is provided internally, and so as to form part of same, with a cam, $o^1$. (See Fig. 6.) The cam $o^1$, engaging the inner end of feed-shaft O, actuates the same forward, its movement being imparted to the feed devices, with which said feed-bar is connected. The feed-bar O has an elongated slot, $o^2$, through which a set-screw, $o^3$, passes. (See Fig. 11.) Said screw is operated from the top of the bed-plate, (see Fig. 1,) and has its lower end properly secured to feed-bar O, (see Fig. 11,) so as to raise or lower it. The object of said screw and its connection with the feed-bar is to lengthen or diminish its throw or its feeding action.

Operation of feed devices. The combined operation of feed-bar and feed-wheels is, therefore, such that the internal cam $o^1$ causes the feed-bar to move forward in a horizontal direction, actuating the sleeve-coupling N, which causes the arm M to move in the opposite direction, the dog $l^6$ moving with it, while its tooth $l^5$ causes the feed-plate L to partly revolve in the same direction, said part revolution of said feed-plate being in turn imparted to feed-wheels $j$ $j$, thereby causing them to feed or move the cloth; the return or reciprocating action of said feeding devices to their original position being produced by the spring $m$. The relation of the vibration of needle with the operation of the feed devices is such that the same operate just before the needle reaches its highest point, and about a quarter of an inch in its following descent to lowest point or said operation of feed devices can be said to take place during a quarter revolution of the driving-shaft.

Pressure-foot: As seen in Figs. 1 and 2, the barrels which receive the pressure-foot piston and needle-shaft are divided into halves by the counterpart sections A A'. P is the pressure-foot; $p$ its piston. The pressure-foot piston $p$ is arranged and operated as usual, (see Fig. 1,) having a spiral spring, $p^1$, in the barrel, and thumb-screw $p^2$, by which said pressure-foot is operated.

Needle-shaft connection: $p^3$, Figs. 1 and 12, is the needle-shaft; this, at its upper end, is formed with a ball and flattened shoulder, $p^4$. (See Figs. 1 and 12.) The needle-shaft at bottom is slotted to form jaws that receive and hold the needle, Figs. 1, 14, to connect the needle-shaft to vibrating arm C. I provide the arm, at its outer end, with a ball cavity or socket, the bottom of which is slotted to receive the ball-head of needle-shaft. The needle-shaft $p^3$ is inserted, so that its ball $p^4$ finds its bearings in the ball-cavity of vibrating arm C, next pass the shoulder $p^4$ of needle-shaft in the open slot of said ball-socket, and the required vertical position for needle-shaft is had. This peculiar connection of the needle-shaft is such as to hold the same in its bearing in the arm; and, further, specially allow the said shaft to have sufficient play when said vibrating arm describes a partial arc or circular movement, this latter result being the chief design of said peculiar connection.

Needle and its connections: The needle $p^5$ I also provide with a ball-head, $p^6$, and from said head the shank is cylindrical. (See Fig. 13.) The needle $p^5$ is provided immediately above the eye with a slight indentation, $p^7$, Figs. 13 and 14, to allow the passage of the hook of the spool-case holder between the needle and thread, thus insuring the engagement of the hook with the thread. To connect the needle $p^5$ to needle-shaft $p^3$, I provide the upper part of its jaw, or form the upper part of its slot, with a cavity fitted to receive the ball-head $p^6$ of the needle. (See Fig. 14.) As indicated in Fig. 14, the needle is self-setting, is always held in place, and its insertion can be done in a perfect manner in a moment of time.

Operation of the machine: Power being applied to the machine, the downward thrust of the needle carries the upper thread through the cloth placed on the cloth-plate. The hook, passing between the thread and the indentation in needle in its descent, forms the thread into a loop, the under part of which loop, lying immediately under the hook, in its rotation, is brought against the abrupt termination of the annular rim of spool-case. Said termination throws the under part of loop inside the spool-case, thereby substantially passing the loop between the bearings of the spool case and holder without strain.

Here it will be specially observed that the loop has been carried between the spool case and holder at the top of the spool-case, or at the point of the thread's contact with its annular rim.

The hook, proceeding in its rotation, carries the loop over the spool-case and spool, and the hook having reached its lowest point, or a short distance beyond its half revolution, the "take-up" acts to carry up the thread, the hook traveling as fast as take-up, which allows it to take off the loop from the opposite end of the annular rim of the spool-case. Thus the stitch is begun and completed at one and the same revolution of the driving-shaft. As soon as two revolutions of the spool-shaft to one vibration of the needle has been made, the operation of the hook or lower spool parts are repeated to begin and complete another stitch. The action of the loop, being passed between the spool holder and case and passed over the spool-case proper, is here accomplished without friction, or the least strain upon the thread.

To unite or loosen the sections A A', or halves of the machine, but three screws are required. It is apparent that, by casting the bed-plate, inclusive of its arm, in two parts, I am thereby enabled to cast the main shaft and all its operating parts in one piece, and also the sub-shaft, carrying the spool-case holder and pinion, in one piece, as before stated. The sectional feature is very material in the manufacture of machines of this class, because of saving and dispensing with the many details of mechanism with which sewing-machines are usually provided. The feed is reliable, all its working parts under the cloth-plate are covered, and its motions are obtained by simple and durable mechanism.

What I claim is—

1. The bed-plate and arm and needle-head, cast or formed in two parts, being counterparts to each other, and provided with bearings and openings for the moving parts, as and for the purpose set forth.

2. The combination of the sectional halves A A', vibrating arm C, pitman C', made in halves, with its yoke $c^1$, screw $c^3$, and shaft D, with its spur-gear $D^1$, eccentric $c^2$, and belt-wheel $D^2$, all constructed to operate substantially as specified.

3. The arbor F, pinion $f$, and spool-holder G, formed in one piece, in combination with spur-gear $D^1$ and shaft D, as and for the purpose set forth.

4. The combination of tension-arm, slack-spring, disk-wheel, and fly-wheel, to form an improved take-up, as and for the purpose set forth.

5. The spool-case holder, provided with a slit and running slot, to allow the insertion and removal of the spool-case, substantially as shown and specified.

6. The herein-described spool-case H, consisting of the part-spherical sides $h^1$ $h^2$, annular rim $h$, partly removed at top to permit the passage of the upper thread between the annular rim of spool-case, and the bearing-groove in the periphery of spool-case holder, as and for the purpose set forth.

7. The combination of spool-case holder G', having hook $g^1$, slot $g^2$, running slot $g^3$, and bearing-groove $g$, with spool-case H, having part-spherical sides $h^1$ $h^2$ and annular rim $h$, all constructed as herein shown and described.

8. The combination of spool shaft I, spring $i$, clasp $i^1$, and spool-case H, as and for the purpose set forth.

9. The ring-plate K, provided with the slit $k$ and stud $k^1$, as and for the purpose set forth.

10. The ring-plate K, provided with slit $k$ and stud $k^1$, combined with cloth-plate J, having notches $j^6$, as and for the purpose set forth.

11. The ring-plate K, having grooved edges $k^2$, combined with cloth-plate J, having projecting rim $j^7$, as and for the purpose set forth.

12. The ring-plate K, having slots $k^3$, as and for the purpose set forth.

13. The combination of ring-plate K, having slots $k^3$, slit $k$, stud $k^1$, and grooved periphery $k^2$, with cloth-plate J, having notches $j^6$ and grooved circumference $j^7$, as and for the purpose set forth.

14. The feed-plate L, having gear $l^3$ and annular chamber $l^4$, in combination with feed-wheels $j$ $j$, as and for the purpose set forth.

15. The feed-plate L, having gear $l^3$ and annular chamber $l^4$, in combination with ring-plate K, as and for the purpose set forth.

16. The combination of curved arm M, dog $l^6$, and spring $l^7$ with ring-plate K, as and for the purpose set forth.

17. A sleeve-coupling, N, having head and shoulder $n$, spherical body $n^1$, and slotted sleeve $n^2$, as and for the purpose set forth.

18. The combination of sleeve-coupling N with curved arm M, to operate as and for the purpose set forth.

19. The feed-bar O, having slot $o^2$, shoulder, and ball-head $o$, as and for the purpose set forth.

20. The combination of feed-bar O with cam $o^1$ of spur-gear $D^1$, as and for the purpose set forth.

21. The combination of feed-bar O, sleeve-coupling N, curved arm M, dog $l^6$, feed-plate L, ring-plate K, feed-wheels $j\ j^1$, and cloth-plate J, as and for the purpose set forth.

22. The combination of feed-bar O, sleeve-coupling N, curved arm M, dog $l^6$, feed-plate L, ring-plate K, feed-wheels $j\ j^1$, and cloth-plate J with cam $o^1$ of driving-shaft, as and for the purpose set forth.

23. The needle-bar, slotted at its lower end to form spring-clips, and provided with a cavity, as described, in combination with needle $p^5$, having ball-head $p^6$, forming part thereof, to permit the setting and securing of said needle, substantially in the manner here shown and specified.

In testimony of said invention I have hereunto set my hand in presence of witnesses.

SIMON W. WARDWELL, JR.

Witnesses:
WILLIAM W. HERTHEL,
GEO. W. SHAW.